Nov. 15, 1966 R. F. KARUHN 3,285,465
SEALING PLUGS
Filed Sept. 24, 1964
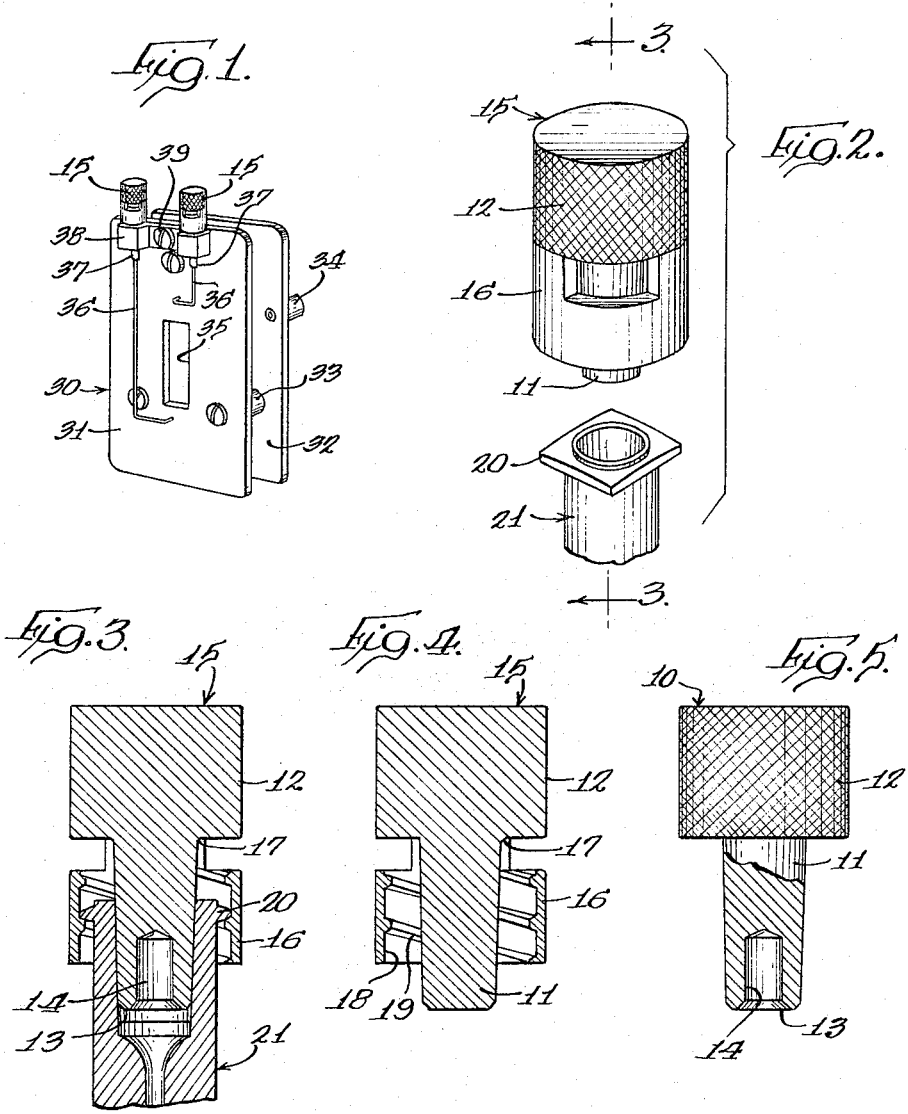
Inventor:
Richard F. Karuhn
By
Gary, Parker, Juettner & Cullinan
Att'ys 3,285,465
SEALING PLUGS
Richard F. Karuhn, Chicago, Ill., assignor to Velsicol Chemical Corporation, Chicago, Ill., a corporation of Illinois
Filed Sept. 24, 1964, Ser. No. 399,031
4 Claims. (Cl. 220—39)

This invention relates to sealing plugs for female fittings, and particularly to sealing plugs for female Luer taper fittings.

Heretofore female fittings on chemical and medical analytical equipment have been stoppered with tapered plugs of a corrosion-resistant plastic material, usually Teflon. These female fittings usually are of standard design and have a standard tapered bore, the taper being called a Luer taper. The Luer taper is 0.060 inch per inch from an initial diameter of 0.155 inch to a final diameter of 0.170 inch over a length of 0.250 inch. Several troublesome disadvantages have been found in using the standard plugs of Teflon or other corrosion-resistant plastic material to stopper the fittings of the cells of chemical analytical equipment, particularly the cells of spectrochemical apparatus such as infrared spectrophotometers and the like. One disadvantage is that due to plastic flow, the slope or fit of the plug often changed resulting in a poor or leaking seal or binding of the plug in the fitting. Another disadvantage is the leakage of the sample, or of the solvent in which the sample is dissolved or suspended, either due to the change in shape of the plug or due to the pressure caused by expansion of the sample or solvent which may arise from heating of the sample by the radiation passing therethrough or from changes in temperature in the cell. Still another disadvantage is the difficulty in removing the plug from the fitting due to a change in shape or composition of the plug.

Therefore, it is one object of the present invention to provide a sealing plug for apparatus having female Luer taper fittings.

Another object of this invention is to provide a corrosion-resistant sealing plug which is not subject to plastic flow for apparatus having female Luer taper fittings.

Another object of this invention is to provide a sealing plug which locks into place and is readily removable without the aid of pliers and the like.

Still another object of this invention is to provide a sealing plug which provides means for compensating for expansion of material sealed in apparatus having female Luer taper fittings.

Other objects and advantages of the present invention and its details of construction will be apparent from the following specification and accompanying drawing in which:

FIG. 1 is a perspective view of an assembled infrared spectrophotometer cell with the female fittings of the cell plugged with sealing and locking plugs of the present invention;

FIG. 2 is a perspective view of a sealing and locking plug of the present invention and a female Luer taper fitting;

FIG. 3 is a section on line 3—3 of FIG. 2 of an expansion-chambered sealing and locking plug of the present invention sealing a female Luer taper fitting and locked thereon;

FIG. 4 is a sectional front elevation of another embodiment of the present invention; and FIG. 5 is a front elevation of another embodiment of the present invention with the shaft partially in section.

Referring to the drawing and particularly to FIG. 5, the friction-fit male sealing plug 10 of the present invention comprises a solid corrosion-resistant metal shaft 11 having a Luer taper, i.e. a taper of 0.60 inch per inch, and a solid corrosion-resistant metal body portion 12 secured to the end of shaft 11 having the largest diameter and aligned, i.e. having the same center-line, with shaft 11. The preferred corrosion-resistant metal is stainless steel. The shaft 11 is adapted for frictionally engaging the heretofore described female tapered fitting. As one embodiment of the present invention, the cylindrical surface of body portion 12 can be knurled as shown in the drawing to aid in placing and removing the sealing plug of this invention.

As a further embodiment of this invention, as shown in FIG. 5, the end 13 of shaft 11 having the smallest diameter can have expansion means, e.g. a hollow cylindrical internal surface or axial recess 14 extending to a limited distance inwardly from end 13. Preferably, the hollow cylindrical internal surface 14 has a diameter of 0.075 inch and extends inwardly 0.1875 inch from end 13. This hollow cylindrical internal surface acts as an expansion chamber to permit materials sealed within the apparatus to expand, eliminating any increase in the pressure on the seals and parts of the apparatus confining the material, thus preventing leakage of the material which often occurred with the plugs heretofore used. It is preferred to use one plug having the expansion chamber with one plug not having the chamber to seal cells having two female Luer taper fittings, such as those normally used with infrared spectrophotometers.

In another embodiment of this invention, as shown in FIG. 4, the plug 15 comprises the shaft 11 and body portion 12 heretofore described, and in addition a tubular skirt 16 about a substantial portion of shaft 11 and secured to and extending from body portion 12 adjacent the junction 17 of body portion 12 and shaft 11. The internal surface 18 of skirt 16 is threaded with screw threads 19 in order to threadingly engage the squared lip 20 of the female Luer taper fittings 21 as shown in FIG. 3.

Another embodiment of this invention, as shown in FIG. 3, is the sealing plug 15, with shaft 11, body portion 12 and internally threaded tubular skirt 16 having in addition expansion means, e.g. the hollow cylindrical internal surface 14 partially extending inwardly from the end 13 of shaft 11 having the smallest diameter. As heretofore described the internal cylindrical surface 14 is preferably 0.075 inch in diameter and preferably extends 0.1875 inch inwardly from end 13 of shaft 11.

Still another embodiment of this invention, as shown in FIGS. 2 and 4, is the sealing and locking plug 15 having shaft 11, body portion 12, and internally threaded tubular skirt 16, as heretofore described and in addition skirt 16 is opposingly slotted perpendicular to its axis adjacent junction 17 of the body portion 12 and shaft 11. The sealing and locking plug 15 with slotted tubular skirt 16 can also have expansion means, e.g. hollow internal surface 14 in shaft 11, as shown in FIG. 3. The slots assist in cleaning the plug 15 under the skirt 16 by flushing with a solvent.

The sealing plugs of the present invention, as shown in FIG. 5 are utilized by inserting and firmly seating the shaft 11 thereof into the bore of the female Luer taper fitting 21, as shown in FIG. 2. The sealing and locking plugs of the present invention, as shown in FIGS. 1—4, are similarly utilized by inserting the shaft 11 thereof into the bore of the female Luer taper fitting 21 as shown in FIG. 2, and in addition engaging threads 19 of tubular skirt 16 with lip 20 of the fitting 21. Upon rotating the plug preferably with the fingers assisted therein by the knurled-surface on body portion 12, the shaft is firmly seated into the bore of fitting 21 and the plug is held fast by the pressure of lip 20 on threads 19. In this manner the fitting 20 is firmly sealed, and in the latter instance the plugs are securely locked into place on the fitting.

FIG. 1 illustrates a cell 30 commonly used with infrared spectrophotometers. Cell 30 is composed of a cover plate 31; a back plate 32; three or more spacers therebetween, spacer 33 being visible in the figure; installing means, such as hanging rods 34 attached to the back plate 32; and two crystalline plates (not shown) installed between cover plate 31 and back plate 32 and exposed by window 35 in cover plate 31 and a window (not shown) similarly positioned in back plate 32. In addition, conduits 36 penetrate cover plate 31 and are inserted through one crystalline plate to the joined faces of the two crystalline plates. The opposing end of conduits 36 are in communication with female Luer taper fittings 37, which may be held in place by a clamp 38 fastened to cover plate 31 by screw 39.

In using the cell according to this invention, a sample is charged through one of the female Luer taper fittings 37 and corresponding conduit 36 into the junction formed by the joined faces of the crystalline plates. The fittings 37 are then sealed as heretofore described with sealing plugs of this invention, preferably one of said plugs being an expansion-chambered plug, and most preferably with sealing and locking plugs of this invention, such as plugs 15, as shown in FIG. 1. After use of the cell in the normal manner the plugs are easily removed by rotating and withdrawing the body portion of the plug away from the fitting. The removal is assisted by the knurled-surface preferably present on the cylindrical surface of the body portion. The sealing and locking plugs of the present invention are readily removed, since rotation of the plug in the appropriate direction unscrews the plug from the lip of the fitting, breaking the seal and withdrawing the shaft from the bore of the fitting.

I claim:

1. A friction-fit male sealing and locking plug comprising a solid corrosion-resistant metal tapered shaft; a solid corrosion-resistant metal cylindrical body portion secured to the end of the shaft having the largest diameter and aligned with the shaft; and an internally threaded tubular skirt about a substantial portion of the shaft, said skirt secured to and extending from the body portion adjacent the junction of the body portion and the shaft.

2. A friction-fit male sealing and locking plug comprising a solid stainless steel tapered shaft; a knurled-surfaced, solid stainless steel body portion secured to the end of the shaft having the largest diameter and aligned with the shaft; and an internally threaded tubular skirt about a substantial portion of the shaft, said skirt secured to and extending from the body portion adjacent the junction of the body portion and the shaft and said skirt being opposingly slotted perpendicular to its axis adjacent the said junction.

3. An expansion-chambered friction-fit male sealing and locking plug comprising a corrosion-resistant metal tapered shaft formed with an axial recess extending partially inwardly from the end of the shaft having the smallest diameter; a knurled-surfaced, solid corrosion-resistant metal cylindrical body portion secured to the opposing end of the shaft and aligned with the shaft; and an internally threaded tubular skirt about a substantial portion of the shaft, said skirt secured to and extending from the body portion adjacent the junction of the body portion and the shaft.

4. An expansion-chambered friction-fit male sealing and locking plug comprising a stainless steel tapered shaft formed with an axial recess 0.075 inch in diameter extending inwardly 0.1875 inch from the end of the shaft having the smallest diameter; a knurled-surfaced solid stainless steel body portion secured to the opposing end of the shaft and aligned with the shaft; and an internally threaded tubular skirt about a substantial portion of the shaft, said skirt secured to and extending from the body portion adjacent the junction of the body portion and the shaft, and said skirt being opposingly slotted perpendicular to its axis adjacent the said junction.

No references cited.

THERON E. CONDON, *Primary Examiner.*

J. B. MARBERT, *Assistant Examiner.*